(12) United States Patent
Schlagel

(10) Patent No.: US 8,606,397 B2
(45) Date of Patent: *Dec. 10, 2013

(54) GRAIN DISTRIBUTION APPARATUS AND METHOD

(71) Applicant: Schlagel, Inc., Cambridge, MN (US)

(72) Inventor: Bill Schlagel, Cambridge, MN (US)

(73) Assignee: Schlagel, Inc., Cambridge, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,068

(22) Filed: Dec. 3, 2012

(65) Prior Publication Data

US 2013/0092503 A1    Apr. 18, 2013

Related U.S. Application Data

(63) Continuation of application No. 13/004,596, filed on Jan. 11, 2011, now Pat. No. 8,369,988.

(51) Int. Cl.
*B65B 1/30* (2006.01)
*G06F 17/00* (2006.01)
*B65G 11/00* (2006.01)
*B65G 65/00* (2006.01)

(52) U.S. Cl.
USPC ........... 700/243; 700/236; 700/239; 414/301; 193/23; 222/48; 222/63

(58) Field of Classification Search
USPC .................. 700/231, 232, 242, 243; 414/301; 222/48, 63; 193/23
See application file for complete search history.

(56) References Cited

U.S. PATENT DOCUMENTS

| | | |
|---|---|---|
| 1,413,505 A | 4/1922 | Stump |
| 2,217,037 A | 10/1940 | Abramoska |
| 3,339,691 A | 9/1967 | Schlagel, Jr. et al. |
| 3,557,924 A | 1/1971 | Schlagel, Jr. |
| 3,762,525 A | 10/1973 | Loveall, Jr. et al. |
| 3,780,887 A | 12/1973 | Bottoms |
| 3,827,578 A | 8/1974 | Hough |
| 3,874,490 A | 4/1975 | McAlister |

(Continued)

FOREIGN PATENT DOCUMENTS

GB        13961        0/1898

OTHER PUBLICATIONS

U.S. Appl. No. 13/004,596, filed Jan. 11, 2011; Inventor: Bill Schlagel.

(Continued)

*Primary Examiner* — Michael K Collins
(74) *Attorney, Agent, or Firm* — Christensen Fonder P.A.

(57) ABSTRACT

A grain distributor including a timer coupled to a distribution spout that generates a series of particular time values. The control processor is programmed with an algorithm to pivot the distribution spout and to receive and record signals from the sensor as the sensor confronts each of the code clusters and each of the proof windows. The control processor is programmed with the algorithm to associate each signal from each code cluster with a particular time value generated by the timer and to memorize the particular time value associated with each code cluster in a long term memory and the control processor being programmed with the algorithm to associate each signal from each of the proof windows in a long term memory. The grain distributor is also self programming.

14 Claims, 11 Drawing Sheets

(56) References Cited

U.S. PATENT DOCUMENTS

| | | |
|---|---|---|
| 4,044,633 A | 8/1977 | Lee |
| 4,059,199 A | 11/1977 | Quaney |
| 4,173,154 A | 11/1979 | Sawmiller et al. |
| 4,398,612 A | 8/1983 | Mikami et al. |
| 4,544,280 A | 10/1985 | Mitsukawa |
| 4,581,704 A | 4/1986 | Mitsukawa |
| 4,664,200 A | 5/1987 | Mikami et al. |
| 4,893,241 A | 1/1990 | Girodat et al. |
| 4,963,733 A | 10/1990 | Spaulding |
| 5,803,695 A | 9/1998 | Schlagel |
| 6,144,197 A | 11/2000 | Shimamura et al. |
| 6,282,476 B1 | 8/2001 | Hieronymus et al. |
| 6,503,041 B2 | 1/2003 | Van Gorp |
| 7,595,633 B2 | 9/2009 | Martin et al. |
| 8,369,988 B2 * | 2/2013 | Schlagel ........................ 700/243 |
| 2012/0065774 A1 | 3/2012 | Peretz |

OTHER PUBLICATIONS

U.S. Appl. No. 13/692,549, filed Dec. 3, 2012; Inventor: Bill Schlagel.

* cited by examiner

GRAIN DISTRIBUTION APPARATUS AND METHOD

CLAIM TO PRIORITY

This application is a continuation of U.S. patent application Ser. No. 13/004,596 filed Jan. 11, 2011 entitled "Grain Distribution Apparatus and Method" now U.S. Pat. No. 8,369,988 the entire contents of which are incorporated herein by reference. This application is also related to U.S. patent application Ser. No. 13/692,549, entitled "Grain Distribution Apparatus and Method", which is a divisional of U.S. patent application Ser. No. 13/004,596 and is filed on the same day as this application.

FIELD OF THE INVENTION

The invention relates generally to grain distributors including carousel style grain distributors and pendulum style grain distributors. More particularly, the invention relates to the electronic control of carousel style or pendulum style grain distributors.

BACKGROUND OF THE INVENTION

Grain distributors are used in grain elevators to distribute grain among one of a plurality of receiving ducts that lead to storage bins or silos. In a grain distributor, a housing encloses a distribution spout that is rotated by a drive motor among multiple discharge positions. Each of the discharge positions is located at a receiving duct. In the prior art, a control wheel is connected to the spout and rotates along with the spout to the various selectable discharge positions.

In some grain distributors, the control wheel includes a plurality of code clusters that can be sensed by sensors, for example, inductive sensors. A code cluster is associated with each discharge position. Each of the code clusters has a unique series of data digits and a series of sequencing digits adjacent to the data digits. The data digits and sequencing digits are read as the digits pass by a sensor that includes a first sensor unit and a second sensor unit. The sensor units are operably connected to a control processor for identifying the position of the spout. The control processor allows the data digits to be read only when a sequencing digit is also being read. When a particular discharge position is selected at the control console, the control processor operates the drive motor until the data digits corresponding to the desired discharge position have been sensed by the sensors. The control processor then continues to operate the drive motor for a pre-selected period of time and stops the motor at a point where the discharge spout should be properly positioned at the selected discharge receiving duct.

The coded portion of the control wheel also includes a position proof window or position proof digit for each coded portion. Each of the position proof windows is positioned on the coded portion so as to confront one of the sensors when the discharge spout has been properly positioned at each discharge position. The sensor detects the proof window to confirm that the discharge spout is aligned with the selected receiving duct at the selected discharge position.

The value of grain crops is closely tied to the consistency of the grain delivered. The accidental addition of a different type of grain to a grain crop can cause a dramatic reduction in the value of the crop. For example the inadvertent mixing of soybeans with corn at the grain elevator can lead to a significant financial loss. Accordingly, it is important that the distribution spout be properly aligned with the appropriate receiving duct to avoid the unintentional intermixing of different grain products, which can result in significant losses to the operator of the grain elevator.

Because of the size of grain elevators, it is not uncommon for the control panel for the grain distributor to be located several hundred feet away from the grain distributor itself. The grain distributor typically is positioned near the highest point of the grain elevator, while the control computer or panel is typically located at ground level.

Once a grain distributor is installed, it is necessary to calibrate the sensors and electronics and program the computer so that the grain distributor can be accurately controlled from the computer panel. In the prior art, this is accomplished by stationing a worker in a location where the worker can observe the location of the spout in the grain distributor.

The worker is equipped with a radio and a work light and observes the motion of the grain distributor while it is being controlled by the computer and relays messages to the programmers far below to adjust the position of the distribution spout relative to each receiving duct so that these positions may be programmed in a computer memory for future use. For example, the observer will report to the programmer that the spout is located in proper alignment with a discharge position. More likely, however, the observer will report that the spout is misaligned and needs to be advanced a small distance. The programmer adjusts the position of the spout based on the observer's instructions. If the distance is misjudged and overshot, the observer will instruct the programmer to move the spout backward somewhat. The programmer does so. Once the spout is aligned with a particular discharge position the position is programmed into memory. This process is repeated for each position of the spout until all proper spout positions are properly aligned and placed into memory.

This situation is time consuming and labor intensive because the worker must position themselves so that they can see the grain distributor and communicate with the programmers by radio. The spout of the grain distributor may weigh 1200 to 1500 pounds and when in motion must be approached with caution.

Distribution spouts are sometimes moved by an electric brake motor. An electric brake motor is an electric motor that includes a brake that is applied to the motor shaft or armature when power is no longer applied to the motor in order to secure the brake motor and the distribution spout in position until actuated again. Brake motors are known to be fairly reliable at stopping the spout at a desired location. The brake motor stops the motion of the spout as instantly as possible. While brake motors are fairly reliable, they are sometimes not sufficiently reliable to prevent unintended mixing of types of grain. Coasting of the brake motor and spout when a signal is sent to stop the motion of the spout can vary considerably depending upon temperature and other environmental conditions. In extreme cold, lubricants tend to be thicker and the brake more effective, thus causing quicker stopping of the spout. When temperatures are very warm, lubricants are thinner and the brake is less effective, allowing a larger amount of coasting after some types of motors are inactivated.

Accordingly, the position proof window and the sensing of the position proof window assure that the grain distribution spout is properly positioned to accurately deliver grain to the desired receiving duct.

The large mass involved in moving a 1200 to 1500 pound grain distribution spout, places a good deal of strain on spockets and chains that are used to move the spout, particularly in pendulum style grain distributors. If the spockets or chains fail, the spout drops toward a vertical position and can misdirect the flow of grain. As discussed above, the financial consequences of misdirecting and mixing for example, corn and soy beans can be significant.

The grain distribution spout can be moved from its desired distribution position by a discontinuity of the grain flow. For example, a frozen lump of grain may cause the spout to shift position. In addition, an electrician or other maintenance worker can accidentally move the grain distribution spout and cause a loss of calibration. The grain may then be misdirected into an adjacent discharge position causing an undesirable mixing of grain types and attendant loss of grain purity and value.

SUMMARY OF THE INVENTION

The present invention solves many of the above discussed problems. The present invention facilitates absolute spout positioning so that each duct which is uniquely identified is accurately accessed. A one-time automated set-up procedure allows the grain distributor of the present invention to learn all parameters of the distributor and even corrects for reverse motor wiring. The grain distributor of the present invention requires no mechanical adjustment. The present invention further facilitates rapid closest path positioning of the spout to any duct. All distributor parameters in the present invention are saved in non-volatile memory in case of power loss. After a power loss, the grain distributor of the present invention verifies spout position when power is restored.

In accordance with the present invention, a housing contains a distribution spout that is rotated by a drive motor among a number of drive positions at each receiving duct. In an example embodiment, a control wheel connected to the spout rotates with the spout to a selected discharge position. The control wheel presents a plurality of code clusters that can be sensed. Each of the code clusters is associated with a discharge position. Each code cluster has a unique series of data digits and a series of sequencing digits adjacent the data digits. The data digits and the sequencing digits are serially read as the digits passed by a sensor that includes a first sensor unit and a second sensor unit. The sensor units are operably connected to a control processor for identifying the position of the spout. The control processor allows the data digits to be read only when a sequencing digit is also being read.

When it is desired to access a particular discharge position of the spout, the control processor operates the drive motor until the data digits corresponding to the desired discharge position have been sensed by the sensors. The control processor then continues to operate the drive motor for a predetermined period of time and stops the motor at which point the discharge spout should be properly positioned at the selected discharge position. Each coded cluster is associated with a proof window. The proof window is positioned on a coded portion to be confronting the sensor when the discharge spout has been properly positioned at the discharge position. The proof window is structured so that it does not include a sequencing digit as do the data digits. In this way, the control processor can always be sure that the wheel and thus the distribution spout is sensing the proof window and not a data slot because the proof window is positioned so that no associated sequencing digit exists.

In accordance with the present invention, the control processor is programmed to perform a one-time automated set-up procedure after the grain distributor of the present invention is installed.

The grain distributor of the present invention includes an inductive sensor to sense the code clusters and the proof windows. The code clusters are structured such that each data position includes a sequence digit which is always present and a data digit which can be present or not present. The sequence digit is sensed by a first sensor while the data digit is sensed by a second sensor. The proof window is only sensed by the second sensor and there is no associated sequence digit.

The controller first rotates the distribution spout to identify how many code clusters exist and, thus, the number of positions to which the spout may be pivoted. For example, the controller commands rotation of the spout and identifies code clusters eleven, twelve and thirteen in sequence indicating that the spout is rotating in a forward direction. The controller continues rotation until all of the code clusters indicating spout positions have been sensed and recorded.

The controller then rotates the distribution spout until the first and second sensors of the inductive sensor detect the first code cluster. Rotation continues until the second sensor senses the first edge of the first proof window. A time counter entry is recorded upon the sensing of the first edge of the proof window. The counter then runs until the second edge of the proof window is sensed and the counter is stopped or the time is recorded. The recorded time from the counter to transit from the first edge of the proof window to the second edge of the proof window is halved to identify the center of the proof window. The half value is then saved and associated with the center of the first proof window. This process may, if desired, continue for each of the plurality of code clusters and proof windows until all of the code clusters and proof windows have been read. If the precision of manufacturing is good for the positioning of the spout and the code clusters it may be sufficient to self program only a single code cluster and spout position and rely on the known spacing of the further code clusters for additional code clusters and spout positions. This procedure may be repeated for each proof window associated with each desired discharge position of the grain distributor.

In one example embodiment, the controller is programmed to predict what the next expected code cluster and proof window should be. If the predicted event does not occur the controller may be programmed to reverse the direction of rotation of the spout until a blank spot where no code cluster elements are present and then to proceed forward again to accurately identify the code clusters encountered.

The identified mid-point values of each proof window are saved in a non-volatile long term memory and used throughout the life of the grain distributor to ascertain accurate positioning of the grain distribution spout. According to one embodiment of the present invention, the motor is a synchronous motor, the speed of which can be controlled by controlling the frequency of the alternating current that is supplied to the motor. The synchronous motor can be precisely started and stopped by control of the frequency of the electricity supplied to the motor. In one example embodiment, the frequency may be controlled by a variable-frequency drive operably coupled to the motor. The application of a variable-frequency drive has the advantage of eliminating all mechanical switches and relays from the vicinity of the grain. This eliminates wearing parts from the system that occur because the switches are operated repeatedly and eliminates arcing that may occur with the operation of relays and mechanical switches.

Another advantage of the use of a variable-frequency drive is improved precision of control as compared to the use of a brake motor. The positioning of the distributor spout is more repeatable with the use of a variable-frequency drive in concert with a synchronous motor. Further, with variable-frequency drive stopping of motion of the grain spout is repeatable regardless of load on the spout and whether the load is positive or negative.

According to another example embodiment of the invention, once the spout is positioned to deliver grain to a particular port the proof window is monitored continuously. If the proof window is found to be out of position, indicating that the spout is out of position error messages are sent to the control console and various actions may be initiated by the controller including automatically stopping the flow of grain to the spout.

The invention also includes a grain distributor having a control processor programmed to perform the above discussed method.

The present invention also includes a computer readable data carrier comprising programming to perform the herein described method and to support operation of the herein described device.

According to another example embodiment of the invention, the computer implemented method of calibrating a grain distributor for electrically controlled operation, further includes identifying the type of grain distributer that is being calibrated and if the grain distributor is a non-circular grain distributor that has end positions at which transit of the distribution spout must stop, identifying those end positions and preventing the spout from striking the end of the grain distributor. Grain distributors come in two basic types, circular distributors in which the spout may transit a circle in either direction and rotate completely around the circle and noncircular distributors that have ends at which the spout must reverse travel direction. Examples of circular distributors are depicted in FIGS. 1-3. Noncircular grain distributors that have two ends are depicted for example in FIGS. 10 and 11. Non-circular two end distributors may include pendulum or swing type distributors as well as distributors that complete an arc but not entire circle. Some of these distributors are known as flatback distributors.

After a new grain distributor or grain distributors are installed, they undergo a self-programming process according to the invention. The invention permits people less skilled in the design and understanding of grain distributors such as an electrician to initiate the initial self-programming of the distributor in accordance with the invention.

When the self-programming process is initiated after installation, the distributor spout may be in any position. That is, the spout may be located such that the sensors are in the midst of a code cluster or the spout may be located such that the sensors are between two code clusters. In accordance with the invention, the self-programming process first identifies whether the distributor is a circular distributor or one that has two ends at which the spout must stop. Second, the self-programming process identifies whether the distributor is one that has five digit code clusters or six digit code clusters. Five digital code clusters are sufficient for circular distributors that have up to 30 ducts. For circular distributors having more than 30 ducts, six digit code clusters are used. Six digit code clusters need not be used for all distributors. The use of six digit code clusters may be limited for smaller distributors because of space constraints. Because of the need to identify the ends of distributors that have end positions at which the spout must reverse direction, noncircular, direction reversing distributors may require six digits code clusters if they have over 18 ducts.

Upon initiation, the program first identifies whether the sensors associated with the spout are located between two code clusters or within a code cluster. This is accomplished by advancing the spout until a complete or partial code cluster is read. If a complete code cluster is read, the control processor operating the inventive self-programming makes a record of the number represented by the complete code cluster read. If only a partial code cluster is read, the control processor commands the spout to reverse direction until the sensors are out of the code cluster and therefore between two code clusters. The spout is then advanced so that the entire code cluster is read. This also provides information as to whether the code cluster is a five digit or six digit code cluster which can be saved. A decision is also made as to whether the code cluster that has been read is a possible end code cluster that would require reversal of the direction of the motion of the spout.

If the code cluster is a possible value of an end code cluster, then the spout is commanded to reverse direction and to read the value of the prior code cluster. In accordance with the invention, end codes clusters are unique, first because they are designed to read different numerical values when they are read in the left to right direction as opposed to being read in the right to left direction. In other words they lack symmetry. End code clusters are unique, secondly, because they are large numbers relative to the numerical values of the other code clusters in the distributor.

This application discusses example end code clusters for five digit code clusters, though similar principles can be applied to six digit code clusters or to code clusters having more than six digits. One example a five digit end code cluster has numerical values of 19 and 25 depending upon which direction the code cluster is read. The binary values of the five positions in the five digit code cluster are 1, 2, 4, 8 and 16. If the first, second and fifth digits are marked in the code cluster when read in a first direction, the value of the code cluster will be 19 because those digits are 1, 2 and 16. 1+2+16=19. If the same code cluster is read in the opposite direction, its value will be 25 because the digits that are marked are read as 1, 8 and 16, 16+8+1=25. Accordingly, if the algorithm encounters a code cluster having a value of 19 when read in a first direction and 25 when read in the opposite direction, the code cluster is, potentially, an end code cluster. It could also be a code cluster representing the nineteenth duct in a circular distributor having more than 18 ducts. Another example end code cluster has a value of 29 and 23. In this case again, a five digit code cluster has four data digits when read from left to right which are the first, third, fourth and fifth positions. When read in a first direction, the binary digits have the values of 1, 4, 8 and 16. 1+4+8+16=29. When read in a second direction, the digits have the values of 1, 2, 4 and 16. 1+2+4+16=23. Thus, this code combination is a potential end code. It is also possible that this code cluster is the $29^{th}$ code cluster in a circular distributor. According to the invention, once a code cluster is read that is a potential end code, the algorithm commands the spout to stop after reading that code cluster and to reverse direction to read the prior code cluster, if the prior code cluster is not a sequential value to the possible end code cluster read, the algorithm determines that this code cluster is an end code cluster and commits that information to memory.

Also, note that a distributor having end codes has a total number of codes including the two end codes that one less than the total number of ducts that the distributor has. For example, a non-circular distributor having four ducts has a total of three codes including two end codes and a single intervening code. An example sequence of codes from left to right is a first end code followed by a code having a value of three followed by a second end code. The first end code used to position the spout at the first duct and the second duct depending on the direction in which it is read. Each duct has an associated proof window. Thus, a two ended distributor according to the invention having four ducts has four proof windows and three total codes including two end codes and one intervening code.

According to the invention, end code clusters may have three qualities, their code clusters have a different numerical value when read right to left as compared to being read left to right, they are non-sequential in numerical value with their adjacent code cluster and they are relatively large numbers as compared to the rest of the code clusters for the distributor.

Once a verified end code cluster has been identified, the algorithm then commands the spout to reverse direction to read all of the sequential end code clusters that exist between the two end code clusters and to identify the end code cluster at the opposite end of the grain distributor.

If no end code clusters are identified, the algorithm then commits to memory the fact that the distributor in question is a circular distributor. In a circular distributor it is possible, in accordance with the invention, to program the operation of the circular distributor so that the spout will take the shortest route around the circle to the next desired grain receiving duct based on the numerical values of the code clusters. This shortest route programming is also utilized in non-circular distributors.

In an example embodiment of the invention, let us assume a flatback non-circular distributor having 18 ducts. This distributor then has two ducts, the first and the $18^{th}$ that are identified by end codes and 16 intervening ducts that are identified by code clusters having values of 3-17. Let us also assume that after the distributor is installed, the spout is positioned so that the sensor is in the midst of the first end code cluster. According to the invention, the spout is commanded to advance and the sensor reads a partial code cluster. At this position, the algorithm commands the spout to stop and reverse direction. The spout then reads all five digits of the end code cluster and determines the value of 25 for the five digits. The spout is then commanded to reverse direction again to read the end code cluster again and reads the value of 19 because of the reversed direction. When this has been done, the end 19-25 code cluster is identified as a possible end code cluster. The spout is then commanded to advance again to read the next code cluster which is number 3. At this point, the algorithm has confirmed that the first cluster read was in fact an end code cluster having the value of 19-25.

The fact that the next code cluster has a non sequential and smaller value of 3, confirms that this is an end code cluster and it is committed to memory that this is a grain distributor that has two ends. The spout then advances and reads the ensuing and code clusters in sequence identifying spout position 2, 3, 4, 5 and so on until it reaches spout position 17. The next code cluster read will also be an end code cluster which will have a value of 23. Because this end code cluster is out of sequence having a value of 23 following 17, it will also be identified as an end code cluster and the algorithm will then commit to memory the fact that this is an end code position of the distributor. Once this procedure has been completed a single time for each distributor within the system, the information is memorized and the distributors may be operated without any need for operator programming of the initial location of the spout and the grain receiving ducts.

In another embodiment of the invention the control processor is further programmed to identify the code clusters having sequential numerical values starting adjacent to the first end code cluster until a second probable end code cluster is identified and confirmed thus identifying all code clusters associated with the distributor.

In another embodiment of the invention the control processor is further programmed to memorize a numerical value of the first code cluster encountered by the sensor and to continue counting the code clusters in sequence until the numerical value of the first code cluster is encountered again thus confirming that the distributor is a circular distributor and identifying the total number of ducts in the distributor.

In another embodiment of the invention the control processor is further programmed to identify whether a first binary digit in the code clusters alternates thereby determining that the spout is moving in a logical forward direction or if the first binary digit does not alternate determining that the spout is moving in a logical backward direction.

In another embodiment of the invention the control processor is further programmed to repeat identifying whether the first binary digit in the code clusters alternates thereby determining that the spout is moving in the logical forward direction or if the first binary digit does not alternate determining that the spout is moving in the logical backward direction three times.

DETAILED DESCRIPTION

Figure 1:
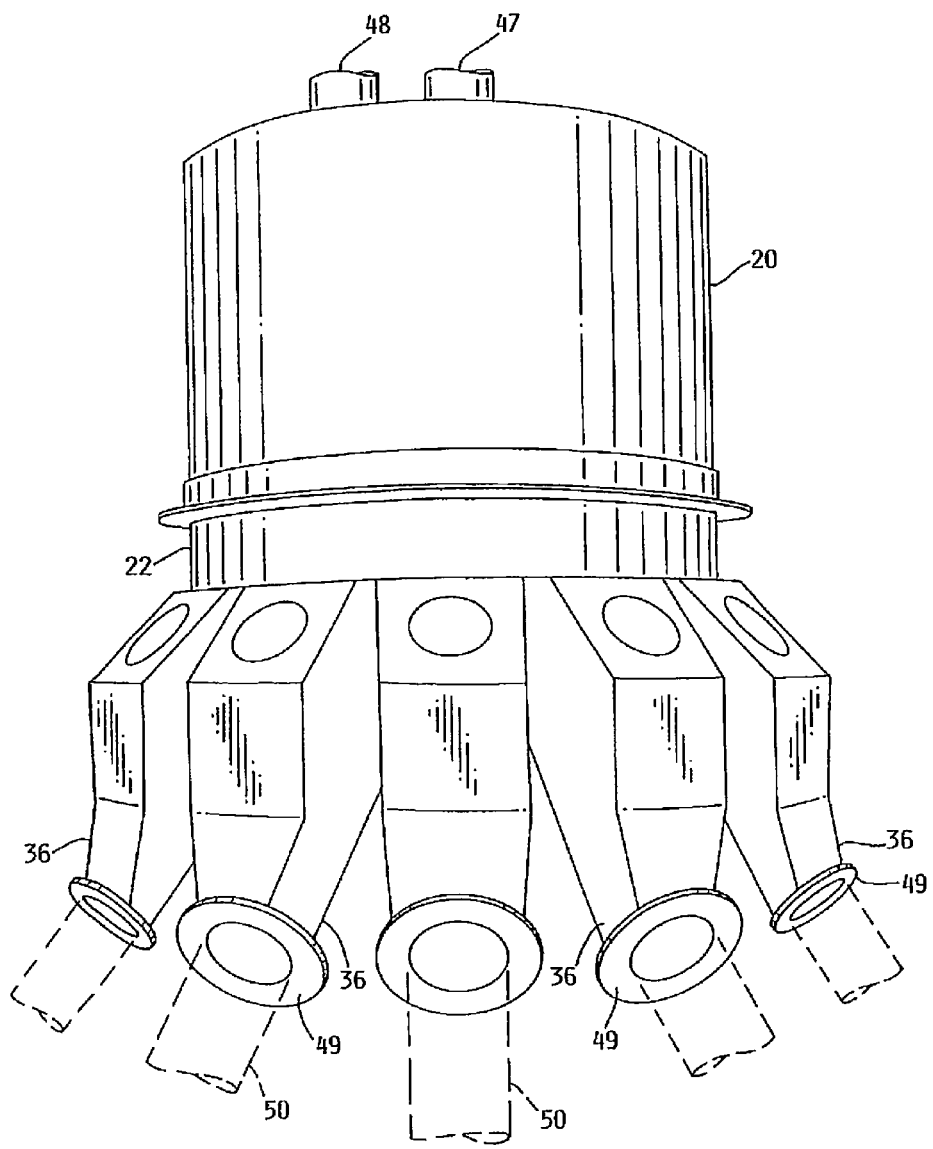
FIG. 1 is a perspective view of an embodiment of the invention with a cylindrical housing, two distribution ducts, and circularly arranged receiving ducts.
Figure 2:
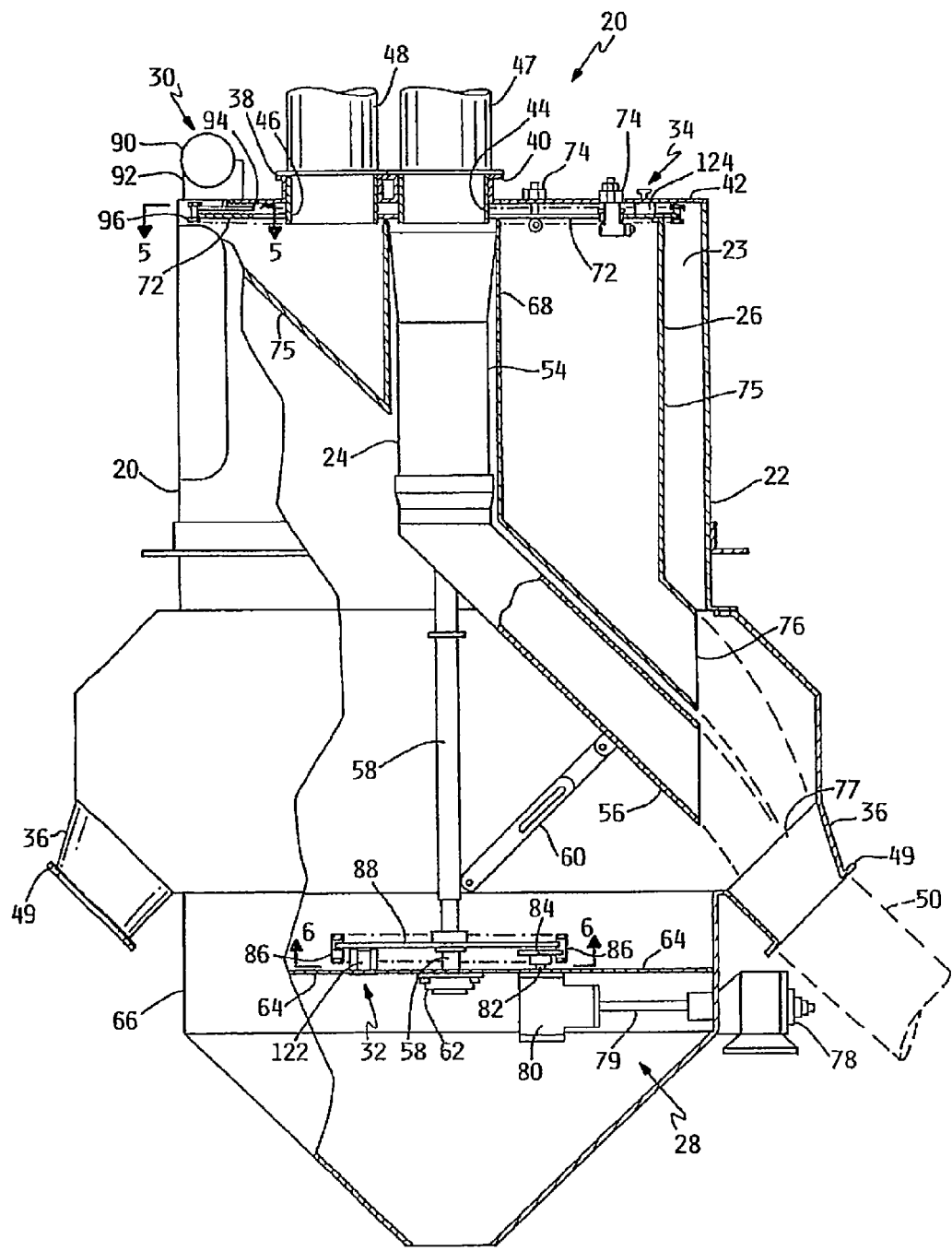
FIG. 2 is a partial sectional elevational view of the embodiment of FIG. 1.

Referring to FIGS. 1 and 2, grain distribution apparatus 20 includes substantially cylindrical housing 22 having open interior 23, within which is contained a pivotal inner distribution spout 24 surrounded by pivotable annular distribution spout 26. Inner distribution spout 24 is rotated by drive means 28. Similarly, annular distribution spout 26 is rotated by second drive means 30. Position sensing of inner distribution spout 24 is provided by inductive sensor 32 and similarly second inductive sensor 34 is provided for annular distribution spout 26.

A plurality of receiving ducts 36 extend downwardly from housing 22. When used herein, "pivotal" is intended to be broadly construed and includes "rotatable" within its meaning.

Grain distribution apparatus 20, as shown in FIGS. 1 and 2, is connectable to two grain sources, not shown, by way of two flanges 38, 40 which extend from top 42 of housing 22 and connect respectively to receiving end 44 of inner distribution spout 24 and receiving end 46 of annular distribution spout 26. Connecting duct work 47, 48, connects flanges 38, 40 to the two grain sources. Receiving ducts 36 similarly include flanges 49 for attachment of connecting duct work 50, shown in phantom lines, for transporting the distributed grain to selected bins, not shown, or elsewhere as desired. Housing 22 and duct work 47, 48, 50 may be fabricated from sheet metal or plate stock by conventional means.

Referring to FIG. 2, inner distribution spout 24 includes receiving end 44, pivoting portion 54, and discharge end 56. Pivoting portion 54 is rotatably supported by shaft 58 which is coaxial with housing 22 and further supported by angular bracing 60 which connects between the discharge end 56 and the shaft 58. Shaft 58 is rotatably mounted on bearing block 62 which is attached to support plate 64 located at bottom 66 of housing 22. Pivoting portion 54 may be axially constrained by inner wall 68 of annular distribution spout 26.

Figure 3:
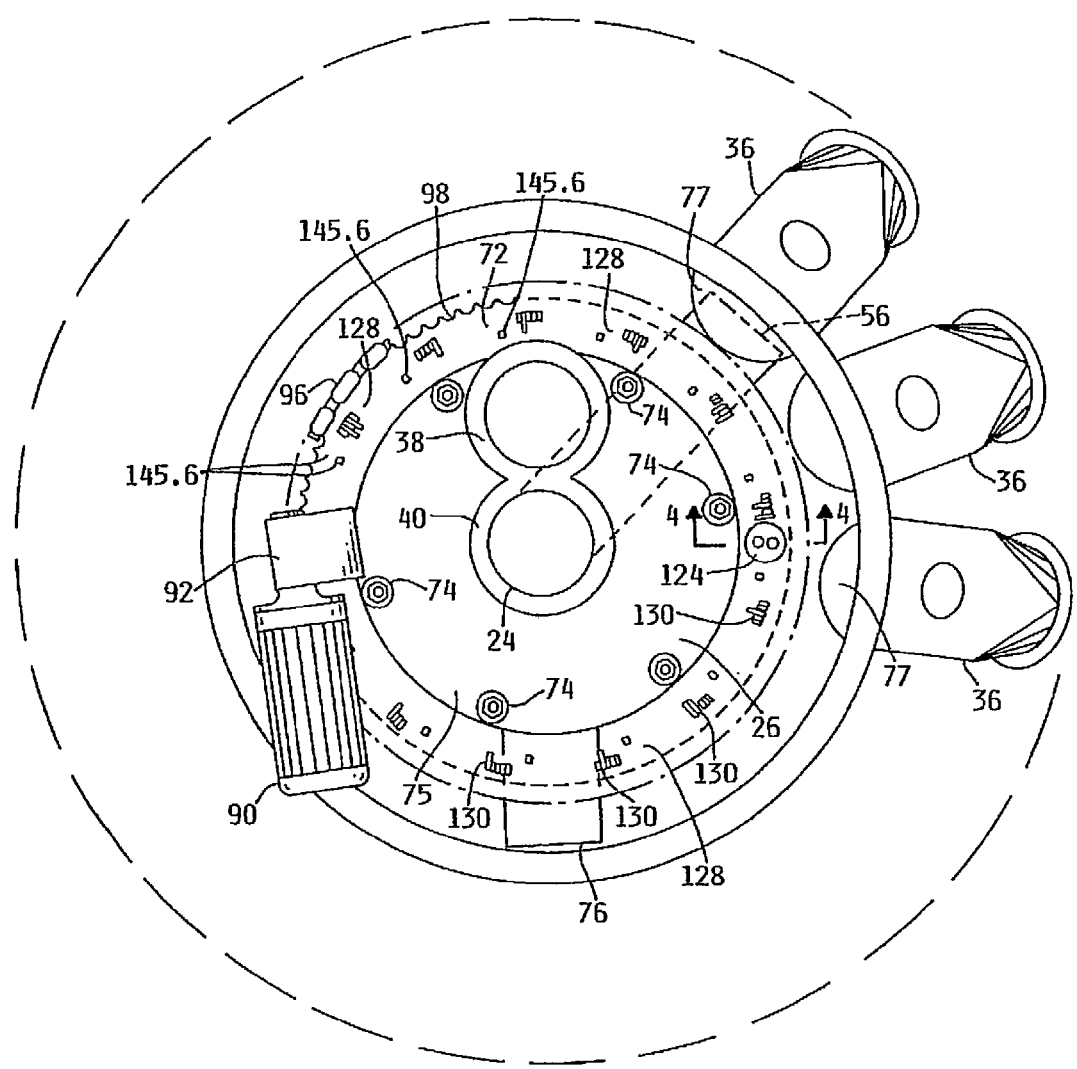
FIG. 3 is a top view of the embodiment of FIG. 1 with parts removed to reveal the inductive sensors and the annular control wheel with embedded code clusters according to an embodiment of the invention.

Annular distribution spout 26 also pivots in a rotational sense and is rotatably supported by attachment to annular control wheel 72 located adjacent to top 44 of housing 22. Annular control wheel 72 is ring-shaped and is supported by a plurality of support roller guides 74 attached to and extending downwardly from top 44 of housing 22 as shown in FIG. 2 and may be generally positioned as shown in FIG. 3. Annular distribution spout 26 includes receiving end 46, rotatable portion 75 attached annular control wheel 72, and discharge end 76.

Discharge end 56 of inner distribution spout 24 and discharge end 76 of annular distribution spout 26 are thus independently rotatable within housing 22 to face receiving ducts 36. Each receiving duct 36 includes receiving portion 77 into which grain is poured from discharge ends 56, 76. Each pivotal or rotational position of discharge ends 46, 76 when directed into receiving portion 77 of each receiving duct 36 defines a pivotal or rotational discharge position.

Drive means 28, 30 for inner distribution spout 24 and annular distribution spout 26, are generally shown in FIG. 2 and have portions shown in greater detail in FIGS. 3, 4, 5 and 6. Referring first to drive means 28 for inner distribution spout 24, motor 78 is mounted externally to housing 22 and connects to shaft 79 in open interior 23 of housing 22 which connects to right angle drive 80 mounted to support plate 64. Shaft 82 extends out of right angle drive 80 and connects to drive sprocket 84. Drive sprocket 84 is engaged to double-wide chain 86 which extends around and is engaged with control wheel 88 configured as a driven sprocket. Control wheel 88 is fixed to control shaft 58 whereby rotation of control wheel 88 also rotates shaft 58 and thus causes pivoting portion 54, and discharge end 56 of inner distribution spout 24 to rotate among the various receiving portions 77 of receiving ducts 36.

Drive means 30 has a similar configuration with motor 90 mounted external to housing 22 and directly connected to right angle drive 92. Extending downward from right angle drive 92 is a shaft and drive sprocket 94 which is engaged to a second double-wide chain 96. Double-wide chain 96 is simultaneously engaged with control wheel 72 which is also configured as a sprocket.

Motors 78, 90, as shown, are conventional electric motors however hydraulic or even pneumatic motors may also be suitable. Additionally, the drive means 28 and second drive means 30 may also include a power take-off arrangement rather than utilizing a direct drive motor. A one-half horsepower three-phase electric motor with an electromechanical brake is generally suitable for this application. Also, suitable are synchronous motors having a variable frequency drive. Thus, the speed of the synchronous motor is controlled by the frequency of its electrical supply.

Referring specifically to FIG. 3, a top plan view of grain distribution apparatus 20 is depicted with top 42 of housing 22 removed, disclosing the positioning and configuration of annular control wheel 72. Motor 92 and support roller guides 74 are shown suitably positioned, although it should be noted that motor 92 and roller guides 74 are attached to and supported by top 52 and top 52 has been removed in this view. Flanges 38, 40 and discharge ends 56, 76 for inner distribution spout 24 and annular distribution spout 26, are depicted in this view. Rotatable portion 75 of annular distribution spout 26 funnels down toward discharge end 76. Double-wide chain 96 is depicted encompassing and engaged with periphery 98 of control wheel 72.

Figure 4:
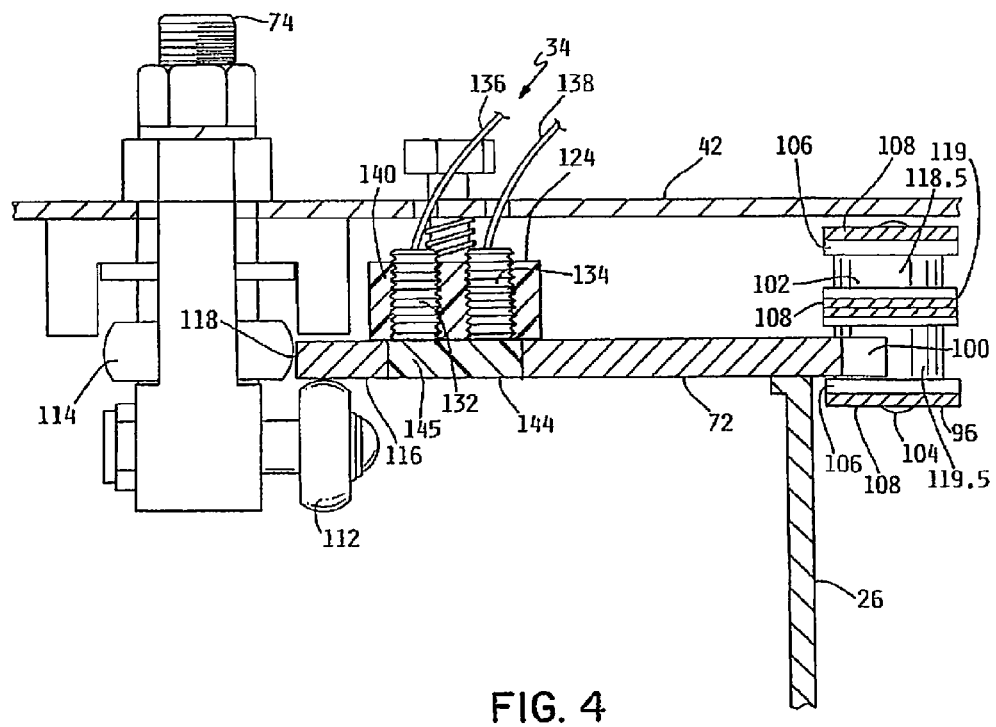
FIG. 4 is a cross-sectional detail of a portion of an annular ring with a support roller guide, inductive sensors, and a double-wide drive chain according to an embodiment of the invention.
Figure 5:
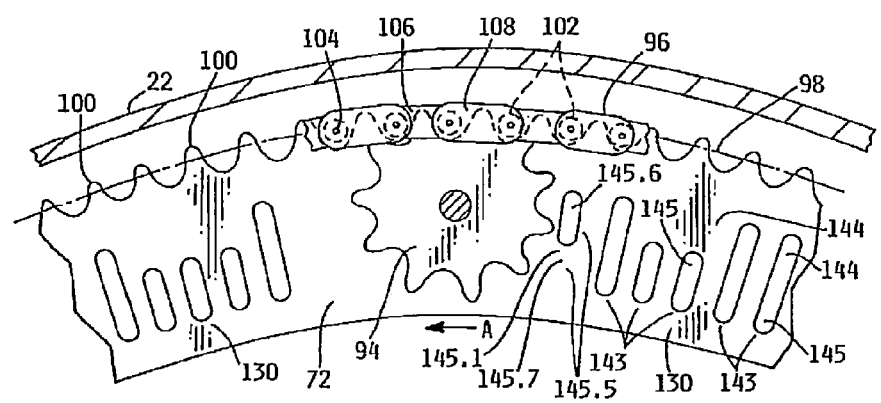
FIG. 5 is a sectional view taken along section 5-5 of FIG. 2 of a portion of the control wheel and the drive sprocket with the double wide chain engaged according to an embodiment of the invention.

FIGS. 4 and 5 depict details of the engagement by double-wide chain 96 with both control wheel 72 and drive sprocket 94. Control wheel 72 has a periphery 98 with a plurality of teeth 100 which engage chain 96. FIG. 4 depicts a cross-sectional view of chain 96 and control wheel 72. Double-wide roller chain 96 is conventional in nature and includes a plurality of rollers 102 and pins 104 with pairs of rollers 102 connected by roller link plates 106 and pairs of pins 104 connected by pin connecting plates 108. FIG. 4 also depicts support roller guide 74. Each guide 74 includes vertically mounted roller 112 and horizontally mounted roller 114 which engage lower surface 116 and inside edge surface 118 of control wheel 72 for supporting and guiding the rotation of control wheel 72 and correspondingly rotatable portion 75 and end 76 of annular distribution spout 26.

Referring to FIGS. 4 and 5, double wide chain 96 includes first portion 118.5 and a second portion 119.5 divided by center links 119. First portion 118.5 is engaged by drive sprocket 94 (not shown in FIG. 4), and second portion 119.5 engages control wheels 88, 72. The sprocket and roller chain may be appropriately sized as best seen in FIG. 4 so that the sprockets fit constrictively within the respective portion of chain 96. The constrictive fit minimizes movement of the chain on the control wheel and thus minimizes chain and sprocket wear.

Figure 6:
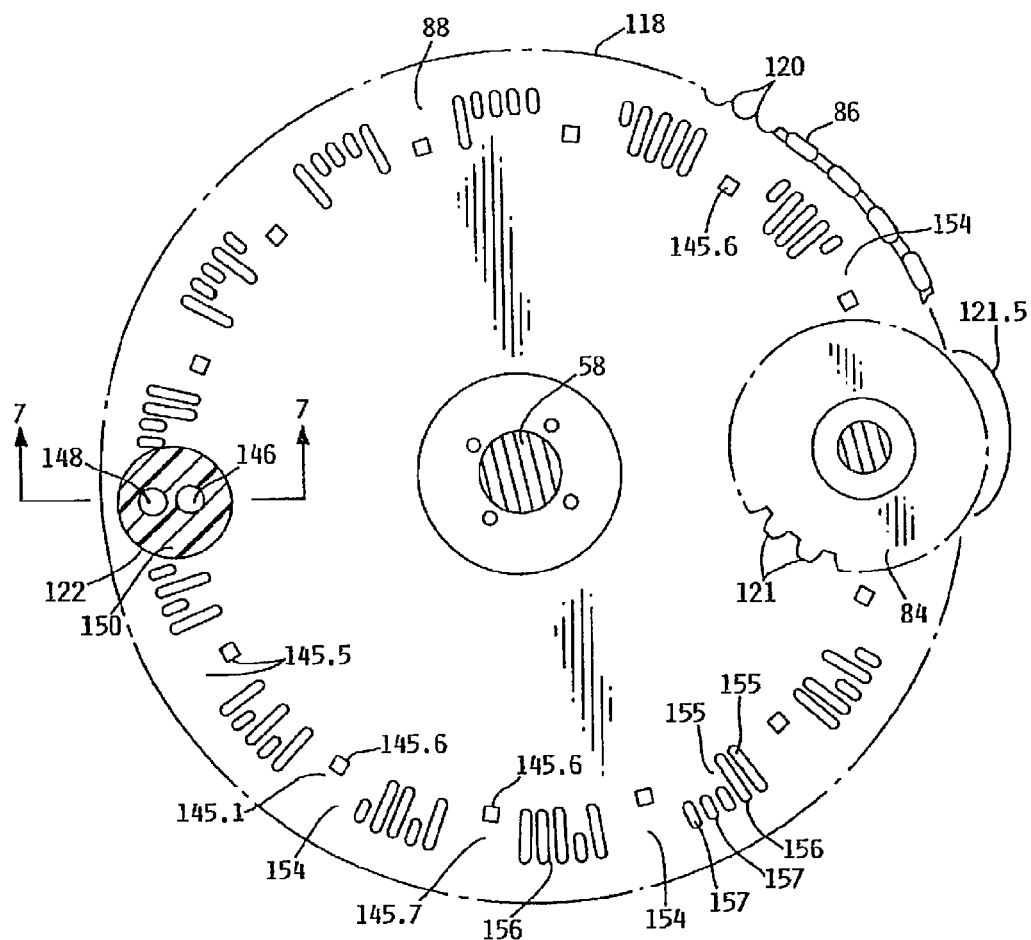
FIG. 6 is a sectional view taken along section 6-6 of FIG. 2 depicting a bottom view of the control wheel with the code clusters, the drive sprockets, the drive chain, and the inductive sensors.

FIG. 6 depicts a partial sectional view taken along section line 6-6 of FIG. 2 showing the control wheel 88 configured as a driven sprocket which rotates the pivoting portion 54 and discharge end 56 of inner distribution spout 24. Control wheel 88 has periphery 118 which has a plurality of teeth 120 for engaging double-wide chain 86. Drive sprocket 84 has similarly spaced teeth 121 relative to control wheel 88. Both control wheel 88 and drive sprocket 84 are engaged with double-wide drive chain 86 simultaneously at the region denoted by the numeral 121.5.

Referring again to FIG. 2, sensing means 32, 34 for sensing the rotational position of inner distribution spout 24 and annular distribution spout 26, are depicted. Sensing means 32 for inner distribution spout 24 includes inductive sensor 122 and control wheel 88. Inductive sensor 122 is suitably attached to support plate 64 and extends upwardly to confront control wheel 88. Similarly, sensing means 34 for the annular distribution spout 26 includes inductive sensor 124 and control wheel 72. Inductive sensor 124 extends downwardly from top 44 of housing 22 to confront control wheel 72.

Referring to FIGS. 3, 4, 5 and 6, the elements of sensing means 32, 34 are depicted in greater detail. FIG. 3 depicts the annular control wheel 72 which includes coded portion 128 that extends circularly around annular control wheel 72. Within coded portion 128 there are code clusters 130, each of which are positioned for and correspond to a rotational discharge position of annular distribution spout 26. Inductive sensor 124 is oriented toward control wheel 72 and control wheel 72 is configured so that as control wheel 72 is rotated, inductive sensor 124 is maintained over coded portion 128 of wheel 72 and code clusters 130 rotate past the sensors 124. FIG. 4 depicts details of inductive sensor 124 confronting control wheel 72 of annular distribution spout 26. Inductive sensor 124 is includes first sensor unit 132 and second sensor unit 134 with lead wires 136, 138 extending from each sensor unit 132, 134 through top 42 and out of housing 22. Sensor units 132, 134 are contained within housing 140 formed of a suitable nonferrous material such as very high molecular weight (VHMW) plastic. Two screws 141, one which is shown in FIG. 4, in conjunction with springs 142 may be utilized to maintain sensor housing 140 in contact with control wheel 72. An example suitable inductive sensor is model Bi 2-P12-80 available from Turck, Inc., 3000 Campus Drive, Minneapolis, Minn. 55441.

FIG. 5 shows a detail of two code clusters 130 on annular control wheel 72. Each code cluster 130 in this example includes five pairs 143 of digits and identifies a particular discharge position of the spout. The five pairs 143 of digits of each code cluster 130 include outer data digit 144 and inner sequencing digit 145. Each discharge position also presents position proof window 145.1 including a pair of digits 145.5 including inner first digit 145.6 and outer second digit 145.7. Position proof digits 145.5 are slightly distanced from the other pairs of digits 143 and are positioned to be in alignment with sensor 124 when discharge spout 26 is appropriately aligned with the discharge position corresponding to any particular code cluster.

Digits 144, 145, 145.6, 145.7 are binary digits where a hole in the coded portion equates to "1" and no metal removed equates to "0". That is, the presence of the base material of the coded wheel constitutes a "0". For this example embodiment sequencing digits 145 in each code cluster always have the value of "1". There are no "0" value sequencing digits. The presence of a sequencing digit 145 designates the presence of an adjacent outer data digit 144. Inner position proof digit 145.6 is positioned to be read by the first data digit sensor unit 132 and has a binary value of "1". Outer position proof digit 145.7 is positioned to be read by second or sequencing digit sensor unit 134 and in this embodiment has the binary value of "0". Significantly, position proof windows 145.1 are the only digit pairs on the coded portions in which the first sensor unit 132 reads a "1" and the second sensor unit 134 reads a "0".

The digits 144, 145, 145.6, 145.7 may be formed by cutting appropriately sized holes into coded portion 128 of control wheel 72 or by any similar technique in which the "0" and "1" digits are differentiated as sensed by the sensor.

Referring to FIG. 4, the cross-section of the annular control wheel 72 shows the two "1" digits 144, 145 of a code cluster positioned immediately below the sensor units 132, 134 of the inductive sensor 124. In this example, the more inwardly positioned first sensor unit 132 is utilized for sensing sequencing digits 145 and the more peripherally positioned second sensor unit 134 is utilized for sensing data digits 144. Digits 144, 145, as shown when designating a "1" can be filled with a nonferrous material where the ferrous material of control wheel 72 has been cut away. This may minimize the likelihood of foreign matter lodging in digits 144, 145. The digits 144, 145, when representing "0", have no metal removed.

Figure 7:
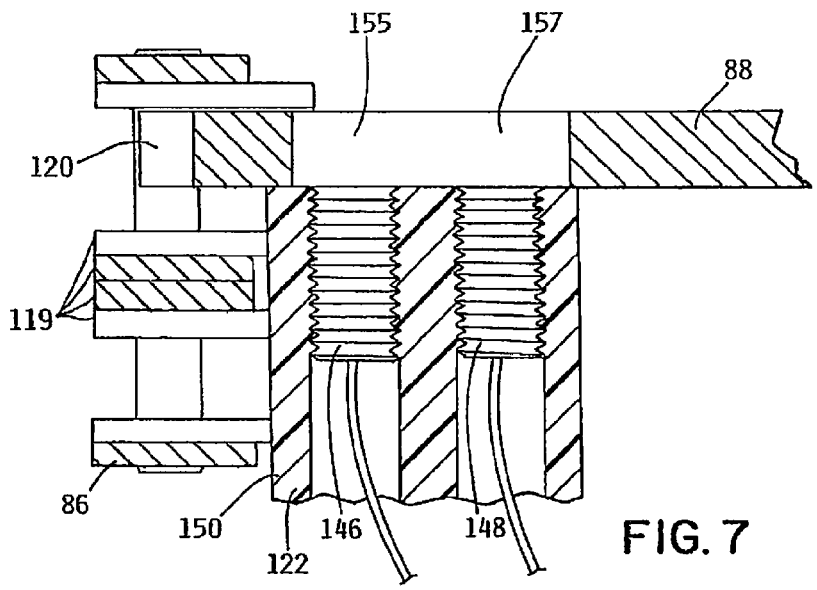
FIG. 7 is a cross-section detail view taken along section 7-7 of FIG. 6 depicting sensor units of an inductive sensor and two digits of a code cluster according to an embodiment of the invention.
Figure 8:
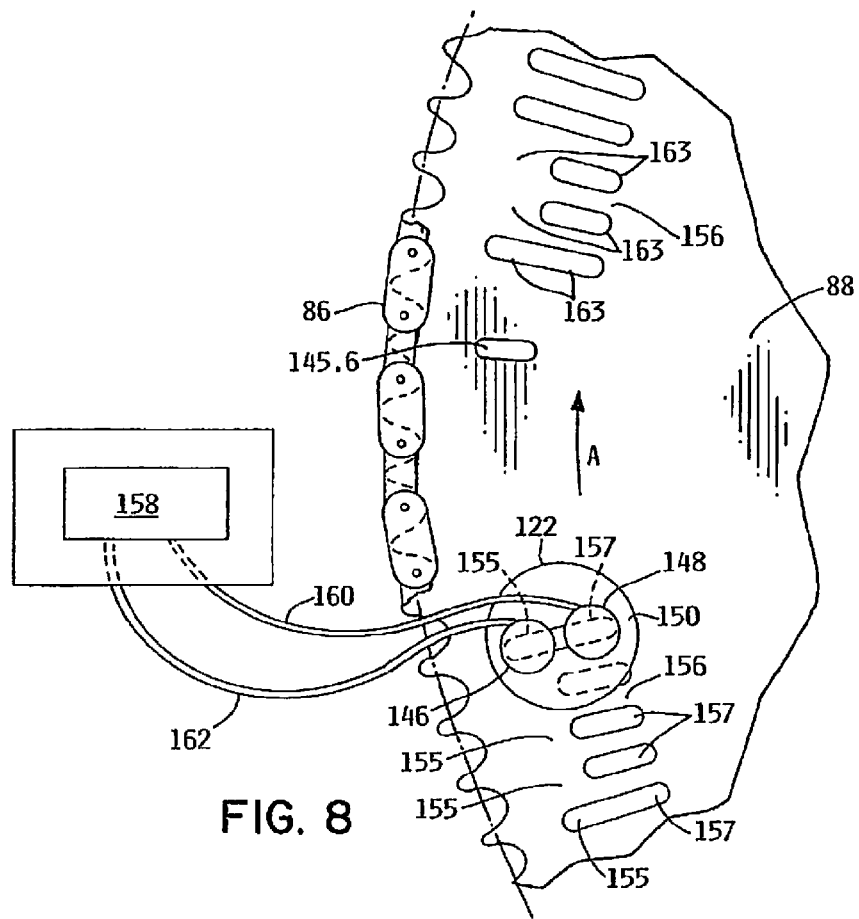
FIG. 8 is a diagrammatic bottom view of the control wheel showing the arrangement of the inductive sensors with respect to the code cluster and showing the sensors connected to the control processor according to an embodiment of the invention.

Referring to FIGS. 6, 7, and 8, details of sensing means 32 for inner distribution spout 24 are depicted. Inductive sensing means 32 includes inductive sensor 122 and control wheel 88. Inductive sensor 122 includes first sensor unit 146 and second sensor unit 148 enclosed in nonferrous housing 150. Control wheel 88 for inner distribution spout 24 also has coded portion 154 which includes code clusters 156 and associated position proof windows 145.1 positioned in a circular arrangement around control wheel 88. In this example embodiment, inductive sensor 122 is positioned on support plate 64, and control wheel 88 is configured so that two sensor units 146, 148 are positioned to sense code clusters 156 as control wheel 88 is rotated.

Note that control wheels 72, 88 of FIGS. 3 and 6 present data digits 155 more inwardly positioned and FIGS. 4, 5, 7, and 8 present the sequencing digits 157 more inwardly positioned on the control wheels. Either positioning is suitable.

FIG. 7 is a detail drawing of inductive sensor 122 confronting control wheel 88. Two digits 155, 157, one above each sensor unit 146, 148 are positioned immediately above inductive sensor 122. Digits 155, 157 as shown, each representing a "1" constitute apertures in control wheel 88 and are not filled with material in this embodiment.

FIG. 8 is a bottom view of inductive sensor 122 with two sensor units 146, 148 positioned at two digits 155, 157 with sensor units 146, 148 electrically connected to control processor 158 by lead wires 160, 162. Each code cluster 156 in this example includes five pairs of digits 163. Each digit 163 includes outer data digit 155 and inner sequencing digit 157. The more inwardly positioned sensor unit 148 is utilized for sensing sequencing digits 157 and more peripherally positioned sensor unit 146 is utilized for sensing data digits.

Figure 9:
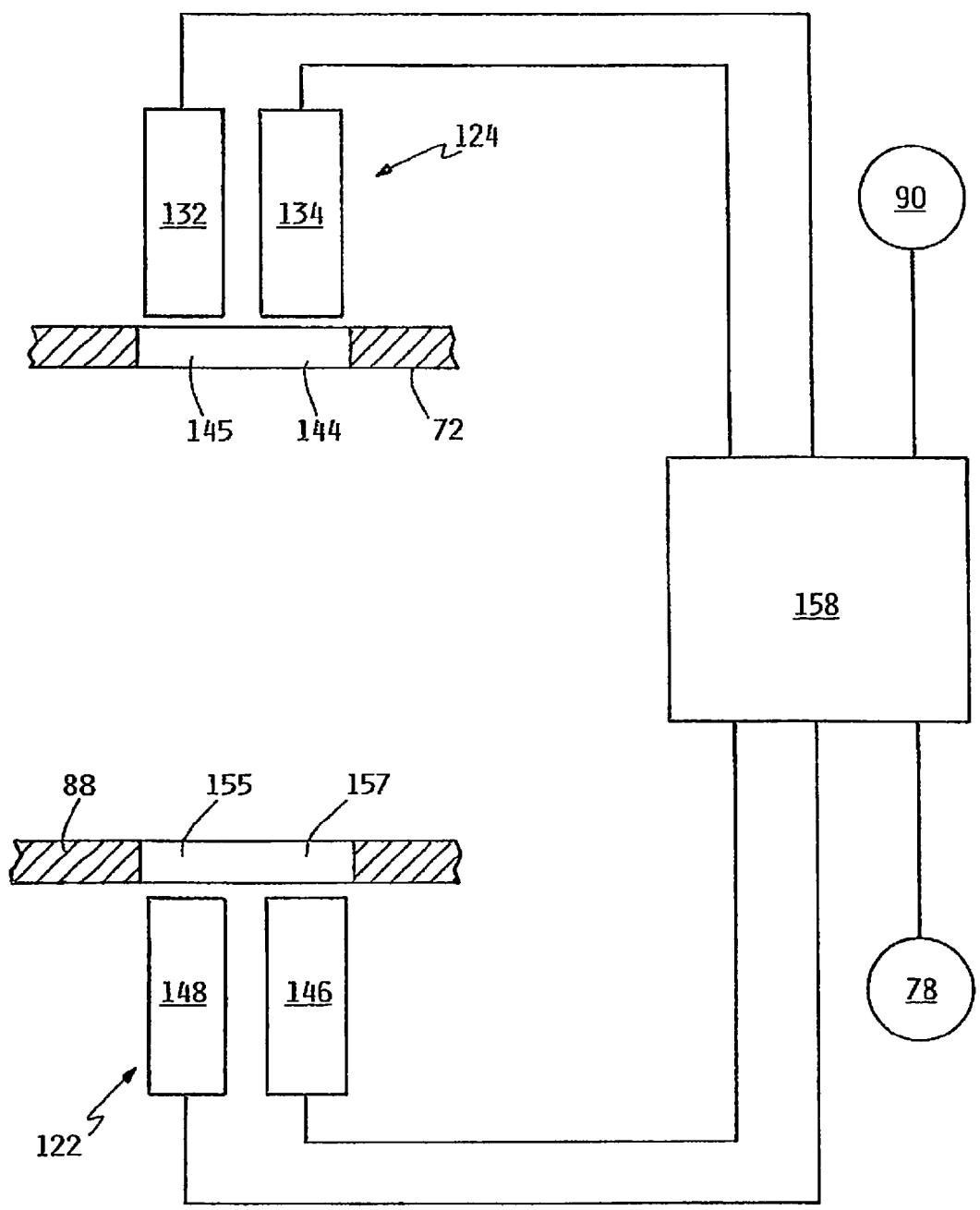
FIG. 9 is a diagrammatic view depicting both inductive sensors and the drive motors connected to the control processor according to an embodiment of the invention.

Referring to FIG. 9, a diagrammatic view of two inductive sensors 122, 124 is shown including individual sensor units 132, 134, 146, 148 electrically connected to control processor 158. Additionally, the electric motors 78 and 90 also are electrically controlled by control processor 158.

Figure 10:
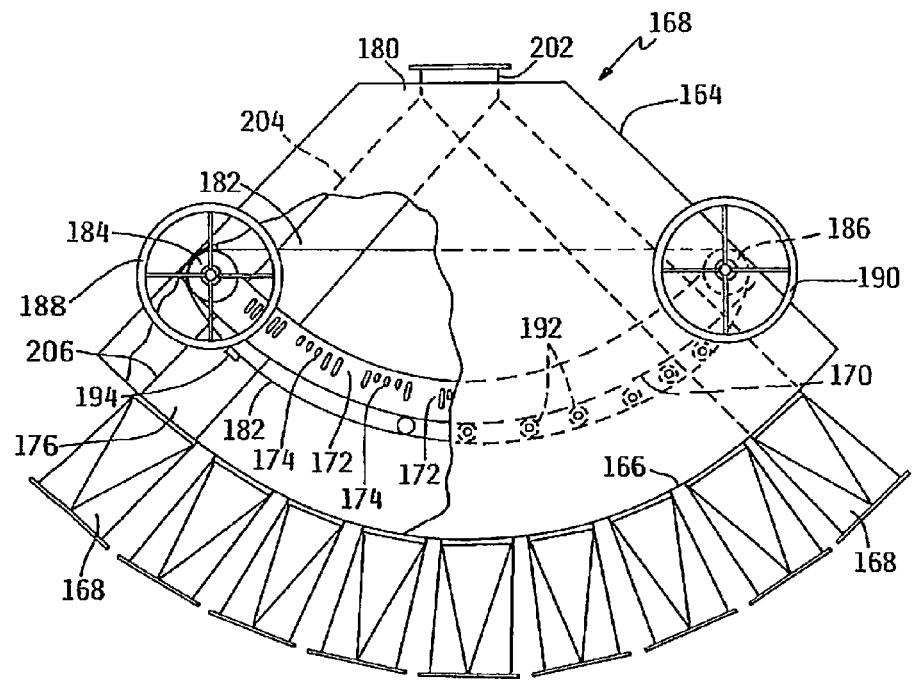
FIG. 10 is a front elevational view of an alternate embodiment of a grain distribution apparatus configured in a "swing set" arrangement, and with the coded portion arranged on an arcuate strip according to an embodiment of the invention.
Figure 11:
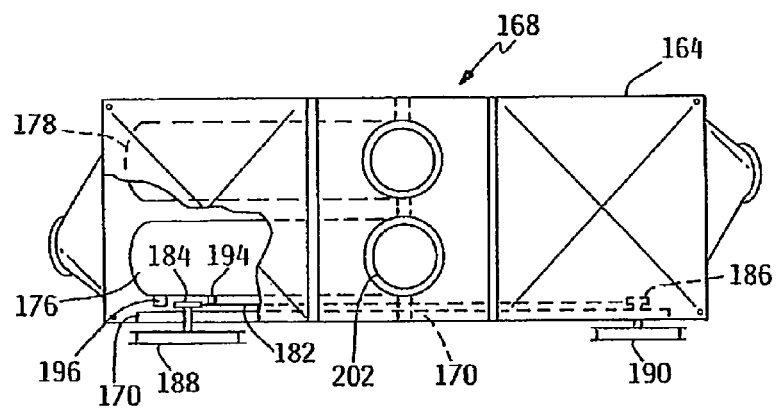
FIG. 11 is a top view of the embodiment of FIG. 10 with the inductive sensors attached to the pendant distribution duct and the arcuate strip attached to the side of the housing according to an embodiment of the invention.

Referring to FIGS. 10 and 11, an additional alternative example embodiment of the apparatus is shown in which housing 164 is somewhat pie-shaped and includes arcuate lower portion 166. This type of grain distribution apparatus 20 is known in the industry as a "swing set" or "pendulum" distributor and is generally indicated by numeral 168. FIG. 10 has a portion of the front of the housing broken away to reveal arcuate control strip 170 which includes coded portion 172 with code clusters 174. Swing set style distributor 168 has two swinging distribution spouts 176, 178 which pivot by suitable means at top 180 of housing 164. Swinging distributor spouts 176, 178 are movable by way of chains 182 one of which is shown in FIGS. 10 and 11. Chain 182 extends between sprockets 184, 186 which are respectively attached to additional sprockets 188, 190. Chain 182 extends in an arcuate manner by way of guides 192 which are attached to housing 164. Swinging distribution duct 176 is anchored to chain 182 by way of bracket 194. Positioned on swinging distribution duct 176 is inductive sensor 196, as depicted in FIG. 11, which confronts coded portion 172 of control strip 170. Code clusters may be of similar design as described in other embodiments. Rotation of additional sprockets 190, 188 by suitable means, such as electric motors swing distribution duct 176 along arcuate lower portion 166 whereby any desired receiving duct may be selected. Similar to other embodiments, the distribution spout includes receiving end 202, pivoting portion 204, and discharge end 206.

Figure 12:
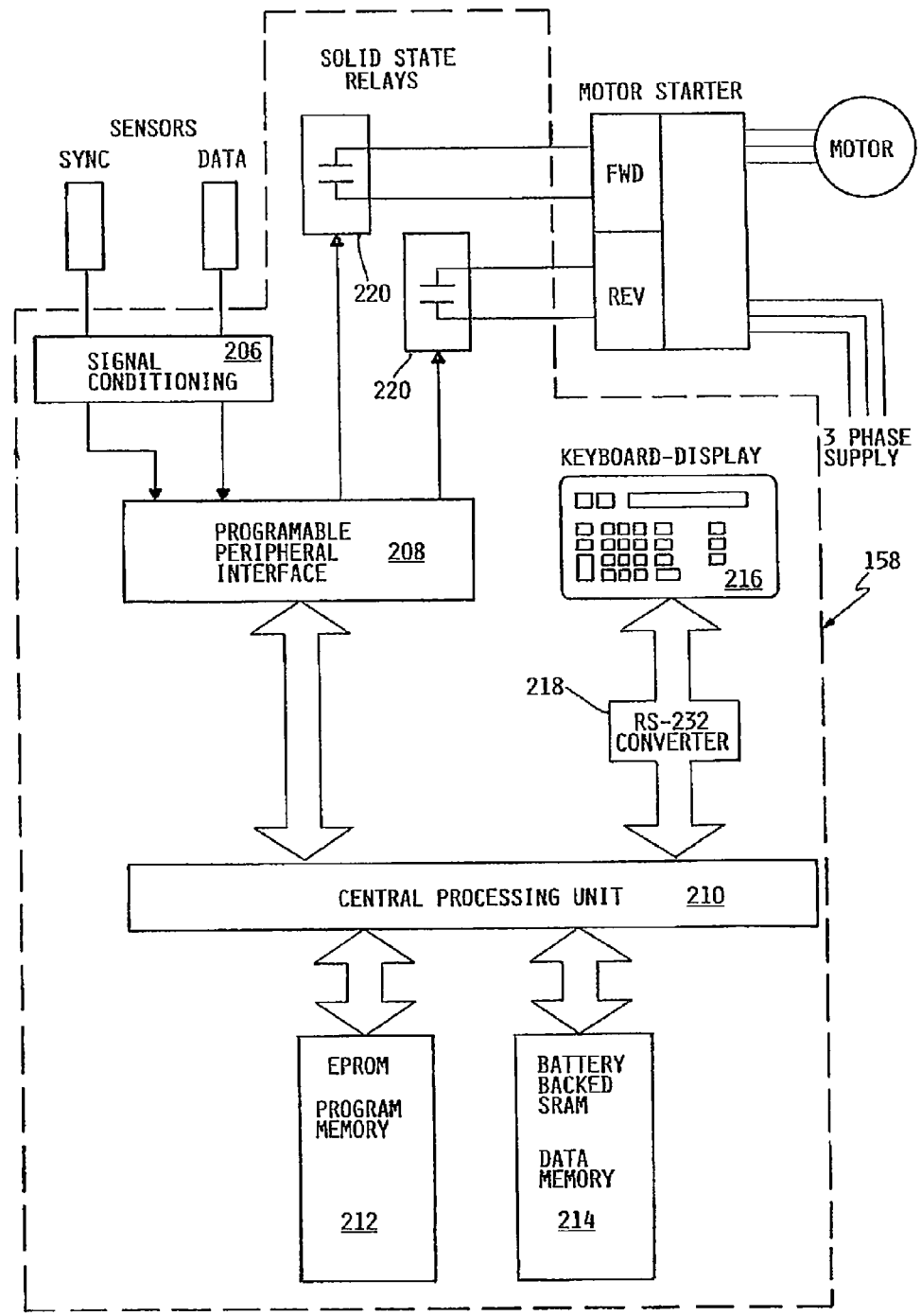
FIG. 12 is a diagrammatic view of a control processor according to an embodiment of the invention.

Referring to FIG. 12, in a diagrammatic representation of a suitable configuration of control processor 158, is shown. Control processor circuitry is conventional and comprises signal conditioning circuitry 207, programmable peripheral interface 208, central processing unit 210, program memory 212, data memory 214, keyboard/display 216, RS-232 converter 218, and solid state relays 220 for controlling the motors. Suitable design and programming details are apparent to those ordinarily skilled in the art.

In operation, referring to FIG. 2, grain distribution apparatus 20 is connected to grain sources by connecting duct work 47, 48 and receiving ducts 36 are connected to desired bins or other grain destinations. With suitable programming in place in control processor 158, a specific receiving duct is selected for either inner distribution spout 24 or annular distribution spout 26. The appropriate motor 78, 90 is activated by control processor 158 to rotate either annular control wheel 72 or control wheel 88 for inner distribution spout 24. For purposes of this explanation of operation annular control wheel 72 will be described. With the activation of motor 90, sprocket and shaft 94 rotate and, by way of their engagement with the double-wide chain 96 which is engaged with annular control wheel 72, annular control wheel 72 also rotates. Connected to and extending downward from the annular control wheel 72 is pivotal or rotatable portion 75 and discharge end 76.

With five data digits in each code cluster 130, 156, 174, a unique numeric value between one (1) and thirty-two (32) has been assigned to each of the code clusters to correspond to a rotational discharge position. This data is stored in control processor 158 by the self programming method disclosed herein.

Referring to FIG. 6, each code cluster 156 shown in FIG. 6 is comprised of five sequencing digits 157 and five data digits 155. Each digit represents the binary numbers "0" or "1" by way of the presence or absence of metal respectively. The "0" digits are simply comprised of the base material of the control wheel 88. As control wheel 88, shown in FIGS. 2, 3, 4, and 5, moves past inductive sensor 122, second sensor unit 148 senses when sequencing digit 157 is in place below the inductive sensor 122. The first or data digit sensor unit 146 becomes operative by way of the control processor 158 to then read paired binary data digit 155 which is then present under sensor unit 146. Data digits 155 cause sensor units to generate a signal comprising a pulse corresponding to a "1" and no pulse for an "0". The signal is transmitted to control processor 158.

The five data digits 155 in a code cluster 156 have an assigned binary value of 1, 2, 4, 8, and 16 respectively. Data digits 144 are read or sensed in sequence and are only read when a sequencing digit 145, which is always a "1", is sensed. Control processor 158 then arithmetically adds the assigned values of the data digits read as "1" to define the address or the positioning of control wheel 72 and thus the distribution spout based on code cluster 156 that has just passed under inductive sensor 122. Significantly each code cluster 156 has a unique numeric value which is conventionally stored in control processor 158. When control processor 158 determines that code cluster 156 with the assigned numeric value for the rotational position that it was searching for has passed under inductive sensor 122, control processor 158 stops motor 90 driving control wheel 72. At this point discharge end 56 of spout 24 should be in perfect alignment in discharge position with the desired receiving portion 77 of the selected receiving duct 36. Control processor 158 may be configured and code clusters 156 positioned to allow the motor 90 to operate for a predetermined amount of time rather than immediately stopping.

In such an alignment position, code cluster 130, 156, 174 corresponding to the selected discharge position will have moved past sensor 32 and sensor 32 will now be stopped over position proof window 145.1. Control processor 158 will suitably acknowledge the proper positioning or activate an alarm if the discharge end or spout is not properly positioned. The width of position proof window 145.1 may be suitably sized to accommodate any acceptable range of positioning of the discharge end of the spout at receiving portion 77. Position proof windows 145.1 thus provide a window of acceptable placement positions.

Moreover, position proof windows 145.1 may monitor the continued proper positioning of the discharge end or spout during a grain transfer.

The grain source is opened allowing the grain to pass into receiving end 46 and into pivoting portion 75. Pivotal portion 75 of annular distribution spout 26 operates as a funnel to direct the grain around inner distribution spout 24 to discharge end 76. Discharge end 76 then directs grain to open receiving portion 77 of receiving duct 36.

Inner distribution spout 24 operates in a like manner. In the embodiment shown in FIGS. 1 and 2, positions for both inner distribution spout 24 and annular distribution spout 26 may be separately selected and the spouts rotate independently of each other.

Notably, the digits and code clusters may be formed from any suitable means in which a sensible code cluster as sensed by the selected sensor are produced. This may take the form of adding additional metal or metal of a different inductivity where inductive sensors are used.

Additionally, different sensors other than inductive are contemplated and may be utilized with the invention. Conventional photoelectric sensing means, capacitive sensing means, and magnetic sensing means are highly suitable for the binary code system just described. In the embodiments described in detail above the digits are inductively differentiated and the inductive sensor units are the sensors. In other embodiments alternate digits constitute other known ways of providing differentiations at the coded portions which would be sensed by other suitable sensors. These include mechanical detents or fingers defining the code clusters which actuate mechanical switches constituting the sensors. Digits with differentiated light absorption characteristics can be used in conjunction with photoelectric or similar sensors. Magnets can be utilized for the "1" digits with reed switches or other magnetic sensing devices as the sensors.

It is further understood that innumerable variations of the coding system are available in which unique signals are generated for various rotational positions. Moreover, the code clusters may be positioned at more rotational positions than just the discharge positions. For example, unique code clusters may be placed at every 10 degrees of rotation.

Significantly, the two inductive sensors and most other suitable sensors require a minimal number of leads to the control processor, typically two from each sensor unit.

The embodiment depicted in FIGS. 10 and 11 operate in a similar fashion except that arcuate control strip 170 which contains coded portion 172 with code clusters 174 is attached to housing 164 and swingable distribution duct 176 caries inductive sensor 196 attached to it. Inductive sensor 196 then moves along control strip 170 as swinging distribution duct 176 is swung by way of chain 182.

Moreover, the embodiments disclosed utilize a coded portion that is fixed to the pivoting spout that moves past a fixed sensor. It is also contemplated that sensors may be fixed to the spout to move past a coded portion fixed to the housing. Thus, where it is stated herein that the coded portion moves with respect to the sensor, either the sensor or the coded portion may be fixed.

Figure 13:
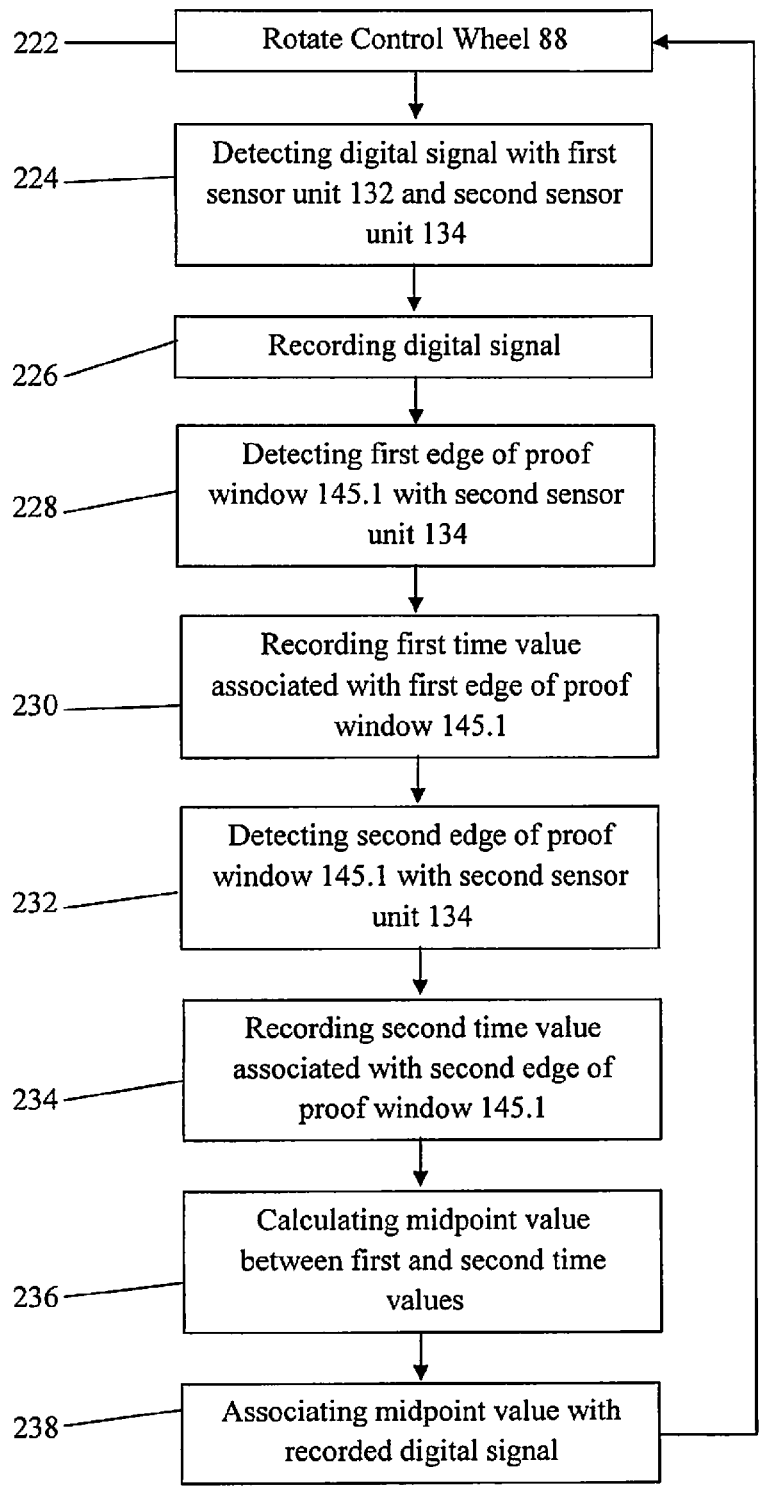
FIG. 13 is a flowchart partially depicting a calibration method according to an embodiment of the invention.

FIG. 13 is a flow chart depicting a calibration method according to an embodiment of the invention. This procedure need be performed only once upon initial installation of the grain distributor apparatus 20 in accordance with the invention.

In an initial step 222, central processing unit 210 is programmed to command the rotation of control wheel 88. Rotation of control wheel 88 causes control wheel 88 to pass by inductive sensor 32 and second inductive sensor 34 which then read code clusters 130. All of code clusters 130 are read to identify the number and position of receiving portions 77.

In step 224, the digital signals represented by code clusters 130 are detected by first sensor unit 132 and second sensor unit 134. The signals are transmitted to central processing unit 210 and recorded in data memory 214 in step 226.

As control wheel 88 rotates, the first edge of proof window 145.1 is detected, the second sensor unit 134. A first time value associated with the first edge when the 145.1 is recorded in step 230.

In step 232 as control wheel 88 continues to rotate, the second edge of proof window 145.1 is detected by second sensor unit 134. Upon detection of the second edge of proof window 145.1 in step 234, the second time value associated with the second edge of proof window 145.1 is recorded.

In step 236, the processor performed a calculation calculating a mid-point value between the first and second time values indicating the first edge and second edge of the proof window 145.1. In step 238, this mid-point value is then associated with the recorded digital signal identifying the spout position.

The example procedure is then repeated for each position of inner distribution spout 24 associated with each of receiving ducts 36 and associated code cluster 130. These values have been stored in computer memory and accessed for future positioning of the spout based on commands from the central processing unit 210.

According to another example embodiment of the invention, the computer implemented method of calibrating a grain distributor for electrically controlled operation, further includes identifying the type of grain distributer that is being calibrated and if the grain distributor is a non-circular grain distributor that has end positions at which transit of the distribution spout must stop, identifying those end positions and preventing the spout from striking the end of the grain distributor. Grain distributors come in two basic types, circular distributors in which the spout may transit a circle in either direction and rotate completely around the circle and noncircular distributors that have ends at which the spout must reverse travel direction. Examples of circular distributors are depicted in FIGS. 1-3. Noncircular grain distributors that have two ends are depicted for example in FIGS. 10 and 11. Non-circular two end distributors may include pendulum or swing type distributors as well as distributors that complete an arc but not entire circle. Some of these distributors are known as flatback distributors.

Figure 14:
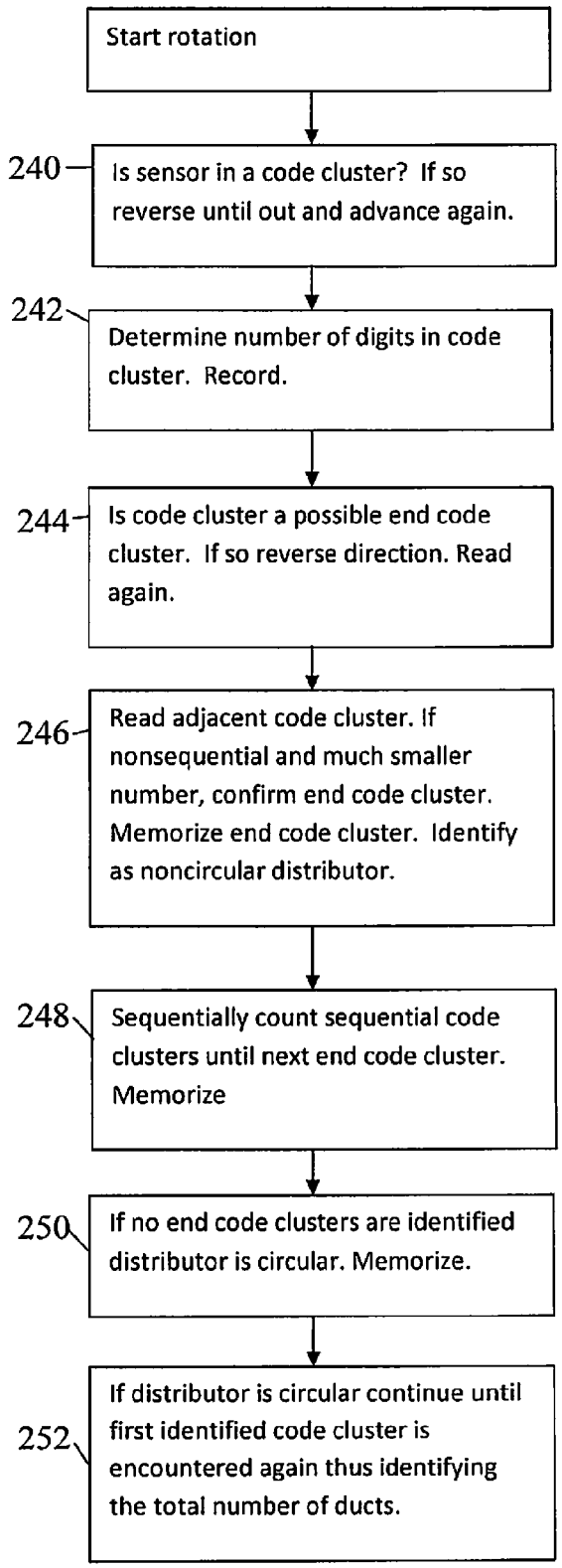
FIG. 14 is another flowchart partially depicting a calibration method according to an embodiment of the invention.

After a new grain distributor or grain distributors are installed, control processor 158 initiates a self-programming process according to the invention. The invention permits people less skilled in the design and understanding of grain distributors such as an electrician to initiate the initial self-programming of the grain distributor 20 in accordance with the invention. FIG. 14 is a flow chart partially depicting a calibration method according to an embodiment of the invention. At 240, when the self-programming process is initiated after installation, distributor spout 24, 26 may be in any position. That is, spout 24, 26 may be located such that inductive sensor 196 is in the midst of a code cluster 156 or the spout may be located such that inductive sensors 196 are between two code clusters 156. In accordance with the invention, the self-programming process first identifies whether the distributor 20 is a circular distributor or one that has two ends at which the spout 24, 26 must stop. Second, at 242, the self-programming process identifies whether the distributor 20 is one that has five digit code clusters or six digit code clusters 156. Five digit code clusters 156 are sufficient for circular distributors that have up to 30 ducts. For circular distributors 20 having more than 30 ducts, six digit code clusters 156 are used. Six digit code clusters 156 need not be used for all distributors. The use of six digit code clusters 156 may be limited for smaller distributors 20 because of space constraints. Because of the need to identify the ends of distributors 20 that have end positions at which the spout 24, 26 must reverse direction, noncircular, direction reversing distributors require six digits code clusters if they have over 19 ducts.

Upon initiation, the program first identifies whether inductive sensors 196 associated with spout 24, 26 are located between two code clusters or within a code cluster. This is accomplished by advancing the spout 24, 26 until a complete or partial code cluster 156 is read. If a complete code cluster 156 is read, the control processor 158 operating the inventive self-programming makes a record of the number represented by the complete code cluster 156 read. If only a partial code cluster 156 is read, the control processor 158 commands the spout 24, 26 to reverse direction until inductive sensors 196 are out of the code cluster 156 and therefore between two code clusters 156. The spout 24, 26 is then advanced so that the entire code cluster 156 is read. This also provides information as to whether the code cluster 156 is a five digit or six digit code cluster 156, which can be saved.

At 244, decision is also made as to whether the code cluster 156 that has been read is a possible end code cluster 156 that would require reversal of the direction of the motion of the spout 24, 26. If the code cluster 156 is a possible value of an end code cluster, then the spout 24, 26 is commanded to reverse direction and to read the value of the prior code cluster 156. In accordance with the invention, end codes clusters are unique, first because they are designed to read different numerical values when they are read in the left to right direction as opposed to being read in the right to left direction. In other words they lack symmetry. End code clusters are unique, secondly, because they represent large numbers relative to the numerical values of the other code clusters 156 in the distributor 20.

This application discusses example end code clusters 156 for five digit code clusters, though similar principles can be applied to six digit code clusters or to code clusters having more than six digits. One example a five digit end code cluster has numerical values of 19 and 25 depending upon which direction the code cluster is read. The binary values of the five positions in the five digit code cluster are 1, 2, 4, 8 and 16. If the first, second and fifth digits are marked in the code cluster when read in a first direction, the value of the code cluster 156 will be 19 because those digits are 1, 2 and 16. 1+2+16=19. If the same code cluster is read in the opposite direction, its value will be 25 because the digits that are marked are read as 1, 8 and 16, 16+8+1=25. Accordingly, if the control processor 158 encounters a code cluster 156 having a value of 19 when read in a first direction and 25 when read in the opposite direction, the code cluster 156 is, potentially, an end code cluster. It could also be a code cluster 156 representing the nineteenth duct in a circular distributor having more than 19 ducts. Another example end code cluster 156 has a value of 29 and 23. In this case again, a five digit code cluster 156 has four data digits when read from left to right which are the first, third, fourth and fifth positions. When read in a first direction, the binary digits have the values of 1, 4, 8 and 16. 1+4+8+16=29. When read in a second direction, the digits have the values of 1, 2, 4 and 16. 1+2+4+16=23. Thus, this code combination is a potential end code. It is also possible that this code cluster is the 29$^{th}$ code cluster in a circular distributor. At 246, according to the invention, once a code cluster 156 is read that is a potential end code, the control processor 158 commands the spout 24, 26 to stop after reading that code cluster 156 and to reverse direction to read the prior code cluster 156, if the prior code cluster 156 is not a sequential value to the possible end code cluster read, the algorithm determines that this code cluster 156 is an end code cluster and commits that information to memory.

According to the invention, end code clusters may have three qualities, their code clusters 156 have a different numerical value when read right to left as compared to being read left to right, they are non-sequential in numerical value with their adjacent code cluster 156 and they are relatively large numbers as compared to the rest of the code clusters 156 for the distributor.

At 248, once a verified end code cluster has been identified, the control processor 158 then commands the spout 24, 26 to reverse direction to read all of the sequential code clusters 156 that exist between the two end code clusters 156 and to identify the end code cluster at the opposite end of the grain distributor 20.

At 250, if no end code clusters are identified, control processor 158 then commits to memory the fact that the distributor 20 in question is a circular distributor. In a circular distributor 20 it is possible, in accordance with the invention, to program the operation of the circular distributor 20 so that the spout 24, 26 will take the shortest route around the circle to the next desired grain receiving duct based on the numerical values of the code clusters. Grain distributors that use microswitch technology must return spout 24, 26 to a home position prior to seeking a new desired position because microswitches must always be approached from a single direction to accomplish accurate placement of spout 24, 26.

For example, let us assume a flatback non-circular distributor 20 having 18 ducts. This distributor then has two ducts, the first and the 18$^{th}$ that are identified by end codes and 16 intervening ducts that are identified by code clusters 156 having values of 3-17. (Note, that the first and second ducts will both be associated with the first end code and are differentiated depending on which direction spout 20, 26 is traveling when the first end code is read.) Similarly, the seventeenth and eighteenth ducts will be identified by the second end code depending on the direction of travel.) Let us also assume that after the distributor 20 is installed, the spout 24, 26 is positioned so that the sensor is in the midst of the first end code cluster 156. According to the invention, the spout 24, 26 is commanded to advance and inductive sensor 196 reads a partial code cluster 156. At this position, control processor 158 commands the spout 24, 26 to stop and reverse direction. The spout 24, 26 then reads all five digits of the end code cluster 156 and determines the value of 25 for the five digits.

The spout 24, 26 is then commanded to reverse direction again to read the end code cluster again and reads the value of 19 because of the reversed direction. When this has been done, the end 19-25 code cluster is identified as a possible end code cluster. The spout 24, 26 is then commanded to advance again to read the next code cluster which will be number 2. At this point, the algorithm has confirmed that the first cluster read was in fact an end code cluster having the value of 19-25.

The fact that the next code cluster has a value of 3 that is non-sequential and much smaller, confirms that this first code cluster is an end code cluster and it is committed to memory that this is a grain distributor that has two ends. The spout 24, 26 then advances and reads the ensuing and code clusters in sequence identifying spout position 2, 3, 4, 5 and so on until it reaches code cluster 17. The next code cluster read will also be an end code cluster which has a value of 23. Because this end code cluster is out of sequence having a value of 23 following 17, it will also be identified as an end code cluster and control processor 158 will then commit to memory the fact that this is an end code position of the distributor 20. Once this procedure has been completed a single time for each distributor 20 within the system, the information is memorized and the distributors 20 may be operated without any need for operator programming of the initial location of the spout 24, 26 and grain receiving ducts 36.

In another embodiment of the invention the control processor is further programmed to identify the code clusters 156 having sequential numerical values starting adjacent to the first end code cluster 156 until a second probable end code cluster 156 is identified and confirmed thus identifying all code clusters 156 associated with the distributor 20.

At 252, in another embodiment of the invention the control processor 158 is further programmed to memorize a numerical value of the first code cluster 156 encountered by inductive sensor 196 and to continue counting the code clusters 156 in sequence until the numerical value of the first code cluster 156 is encountered again thus confirming that the distributor 20 is a circular distributor 20 and identifying the total number of ducts in the distributor.

In another embodiment of the invention the control processor 158 is further programmed to identify whether a first binary digit in the code clusters 156 alternates thereby determining that the spout is moving in a logical forward direction or if the first binary digit does not alternate determining that the spout 24, 26 is moving in a logical backward direction.

In another embodiment of the invention the control processor 158 is further programmed to repeat identifying whether the first binary digit in the code clusters 156 alternates thereby determining that the spout 24, 26 is moving in the logical forward direction or if the first binary digit does not alternate determining that the spout is moving in the logical backward direction three times.

If distributor 20 is a circular distributor 20 control processor 158 is further programmed to continue advancing until the first encountered code cluster 156 is encountered. Then the total number of duct in the distributor 20 is known. Control processor 158 is programmed to cause spout 24, 26 to take the shortest directional route from its present location to the next desired duct location. For example in a twenty duct circular distributor, control processor 158 commands the spout to advance four ducts to get from duct number 18 to duct number 2 rather than to reverse 16 duct positions to get to the same duct position.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A grain distributor comprising
a housing with an open interior;
a plurality of receiving ducts extending from the housing, each receiving duct having a receiving portion in the interior of the housing;
a distribution spout pivotally moveable among and stoppable at each of the receiving portions, the distribution spout having a plurality of pivotal positions;
a drive motor connected to the housing and distribution spout that moves and stops the distribution spout;
a coded portion with a plurality of code clusters operably coupled to the distribution spout, each code cluster including a unique series of data digits indicative of a pivotal position of the distribution spout;
a plurality of proof windows, each proof window being associated with a receiving duct location;
a sensor configured to sense the data digits and generate corresponding signals, the sensor and coded portion being coupled to the distribution spout and housing such that the sensor confronts the coded portion and such that pivotal movement of the distribution spout moves the coded portion with respect to the sensor or moves the sensor with respect to the coded portion, the code clusters arranged such that the data digits of each code cluster move sequentially past the sensor whereby the code clusters are serially read;
a control processor operably connected to the sensor, the control processor configured to receive the signals from the sensor and to determine the pivotal position of the distribution spout based in the signals;
a timer operably coupled to the control processor;
the control processor programmed with an algorithm to pivot the distribution spout and to receive and record signals from the sensor as the sensor confronts each of the code clusters and each of the proof windows;
the control processor being programmed with the algorithm to associate each signal from each code cluster with a particular time value generated by the timer and to memorize the particular time value associated with each code cluster in a long term memory; and
the control processor being programmed with the algorithm to associate a signal from at least one of the proof windows in a long term memory.

2. The grain distributor as claimed in claim 1, the control processor further being programmed to sense a first edge of the proof window and a second edge of the proof window and to save the unique time values generated by the timer associated with each of the first edge of the proof window and the second edge of the proof window and to calculate a midpoint value between the unique time values generated by the timer associated with the first edge of the proof window and the second edge of the proof window and to save the midpoint value.

3. The grain distributor as claimed in claim 2, the control processor further being programmed to use the saved midpoint value to control alignment of the distribution spout with the receiving portion of each receiving duct by operation of the drive motor.

4. The grain distributor as claimed in claim 1, the control processor further being programmed to monitor the position of the proof window while grain is being transferred to one of the plurality of receiving ducts from the distribution spout.

5. The grain distributor as claimed in claim 4, the control processor further being programmed to send an error message if the position of the proof window changes while grain is being transferred to one of the plurality of receiving ducts from the distribution spout.

6. The grain distributor as claimed in claim 4, the control processor further being programmed to activate a valve to stop the flow of grain if the position of the proof window changes while grain is being transferred to one of the plurality of receiving ducts from the distribution spout.

7. The grain distributor as claimed in claim 1, the control processor further being programmed to identify a number of digits in the code clusters of the distributor.

8. The grain distributor as claimed in claim 1, the control processor further being programmed to identify whether the grain distributor is a circular grain distributor or a noncircular grain distributor having end positions at which the distribution spout must reverse direction.

9. The grain distributor as claimed in claim 8, the control processor further being programmed to identify a code cluster as a probable end code cluster if the code cluster has a different numerical value when read from left to right as compared to being read right to left and if the code cluster has a large numerical value relative to other code clusters of the grain distributor.

10. The grain distributor as claimed in claim 8, the control processor further being programmed to identify probable end code clusters and when a probable end code cluster is identified to read an adjacent code cluster to confirm or deny that the probable end code cluster is in fact an end code cluster and to confirm that a probable end code cluster is in fact a first end code cluster.

11. The grain distributor as claimed in claim 10, the control processor further being programmed to identify the code clusters having sequential numerical values starting adjacent to the first end code cluster until a second probable end code cluster is identified and confirmed thus identifying all code clusters associated with the distributor.

12. The grain distributor as claimed in claim 8, the control processor further being programmed to memorize a numerical value of the first code cluster encountered by the sensor and to continue counting the code clusters in sequence until the numerical value of the first code cluster is encountered again thus confirming that the distributor is a circular distributor and identifying the total number of ducts in the distributor.

13. The grain distributor as claimed in claim 9, the control processor further being programmed to identify whether a first binary digit in the code clusters alternates thereby determining that the spout is moving in a logical forward direction or if the first binary digit does not alternate determining that the spout is moving in a logical backward direction.

14. The grain distributor as claimed in claim 13, the control processor further being programmed to repeat identifying whether the first binary digit in the code clusters alternates thereby determining that the spout is moving in the logical forward direction or if the first binary digit does not alternate determining that the spout is moving in the logical backward direction three times.

* * * * *